US006533661B2

(12) United States Patent
Sanders

(10) Patent No.: US 6,533,661 B2
(45) Date of Patent: Mar. 18, 2003

(54) GAMING MACHINE

(75) Inventor: Michael Sanders, Piedmont, SC (US)

(73) Assignee: Bestco, Inc., Piedmont, SC (US)

( * ) Notice: Subject to any disclaimer, the term of this patent is extended or adjusted under 35 U.S.C. 154(b) by 0 days.

(21) Appl. No.: 09/910,969

(22) Filed: Jul. 23, 2001

(65) Prior Publication Data

US 2003/0017869 A1 Jan. 23, 2003

(51) Int. Cl.[7] .................................................. A63F 13/00

(52) U.S. Cl. ............................. 463/20; 463/26; 463/27; 273/143 R

(58) Field of Search ............................... 463/16–20, 25, 463/26, 27; 273/138.1, 142 R, 143 R, 142 H

(56) References Cited

U.S. PATENT DOCUMENTS 5,393,057 A * 2/1995 Marnell, II ................. 273/269
5,722,891 A 3/1998 Inoue .......................... 463/20
5,820,459 A * 10/1998 Acres et al. .................. 463/16
5,868,619 A * 2/1999 Wood et al. ................ 273/292
5,997,401 A 12/1999 Crawford ..................... 463/20
6,059,289 A 5/2000 Vancura .................. 273/143 R
6,089,976 A 7/2000 Schneider et al. ............ 463/16
6,089,978 A 7/2000 Adams ........................ 463/20
6,093,102 A * 7/2000 Bennett ................... 273/138.1
6,135,884 A 10/2000 Hedrick et al. ............... 463/20
6,139,013 A 10/2000 Pierce et al. ............ 273/121 B
6,155,925 A 12/2000 Giobbi et al. ................. 463/20
6,159,097 A 12/2000 Gura ........................... 463/20
6,168,523 B1 * 1/2001 Piechowiak et al. .......... 463/16
6,190,255 B1 2/2001 Thomas et al. ............... 463/20

* cited by examiner

*Primary Examiner*—Gene Mancene
*Assistant Examiner*—Patrick Buechner
(74) *Attorney, Agent, or Firm*—McNair Law Firm, P.A.

(57) ABSTRACT

A gaming machine having a plurality of reels, each with a plurality of symbols. A processor causing the symbols to change alignments when activated by a player. The machine is programmed with a plurality of winning combinations of selected different values. The combinations are accessed to a player when predetermined alignments of the symbols occur. A jackpot and a down pot each of a select value greater than any one of the combination of values, are provided. The jackpot is accessed to the player by an alignment of designated of the symbols. The down pot is accessed to a plurality of incentive pots by an alignment of another of the designated symbols. Each incentive pot is then accessed to the player by the alignment of selected ones of the predetermined alignments of the symbols along with the preselected value already designed these predetermined alignments.

16 Claims, 2 Drawing Sheets

GAMING MACHINE

BACKGROUND OF THE INVENTION

The instant invention is directed to an added incentive program for gaming machines.

It is well known that in order for gaming machines to be successful it is necessary to retain the interest and expectations of the player. This has been done by providing machines with the availability of a plurality of winning lines, with the availability of playing a plurality of machines at one time and with programs which operate a plurality of games simultaneously.

The instant invention has, as its object, a gaming machine which does not require a plurality of games but which builds additional value incentives to continue to play within programmed games.

Another object of the invention is a gaming machine which provides a pair of major prizes payable directly and indirectly.

Another object of the invention is a gaming machine with an indirect prize which is winnable by winning a lesser prize.

Another object of the invention is a gaming machine with more combinations of wins and more bonus wins.

SUMMARY OF THE INVENTION

The instant invention is directed to a gaming machine having a plurality of reels, each having a plurality of symbols. The machine includes a processor which causes the symbols to change alignments when activated by a player. A plurality of selected alignments of the symbols are preselected to provide a plurality of winning combinations of different values. The value of the combinations is accessed to the machine player whenever alignment of a preselected combination is achieved.

A jackpot of a select value greater than the value of any one of the combinations of values is provided. The jackpot value is accessed or payment is delivered to the player whenever a designation of the symbols becomes aligned. A down pot which also is of a select value greater than any one of the combination of values is also provided. The down pot value is divided and delivered to a plurality of incentive pots whenever alignment of another preselected designated alignment of symbols preselected to cause delivery of the down pot is achieved. The jackpot and the down pot symbols differ.

The value of each incentive pot is set to be delivered to the player when alignment of yet, another preselected of the predetermined alignments of symbols is achieved. The preselected value of this predetermined alignment is also delivered to the player at this time. This insures a payout whether or not value has accumulated in the incentive pots. Each incentive pot is tied to a different value set of the predetermined alignments.

The gaming machine may operate with reels which are mechanical or video reels. There are normally three reels, however, the number could be four reels or more. The predetermined alignments of symbols may appear along one, three, five, eight or more lines.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
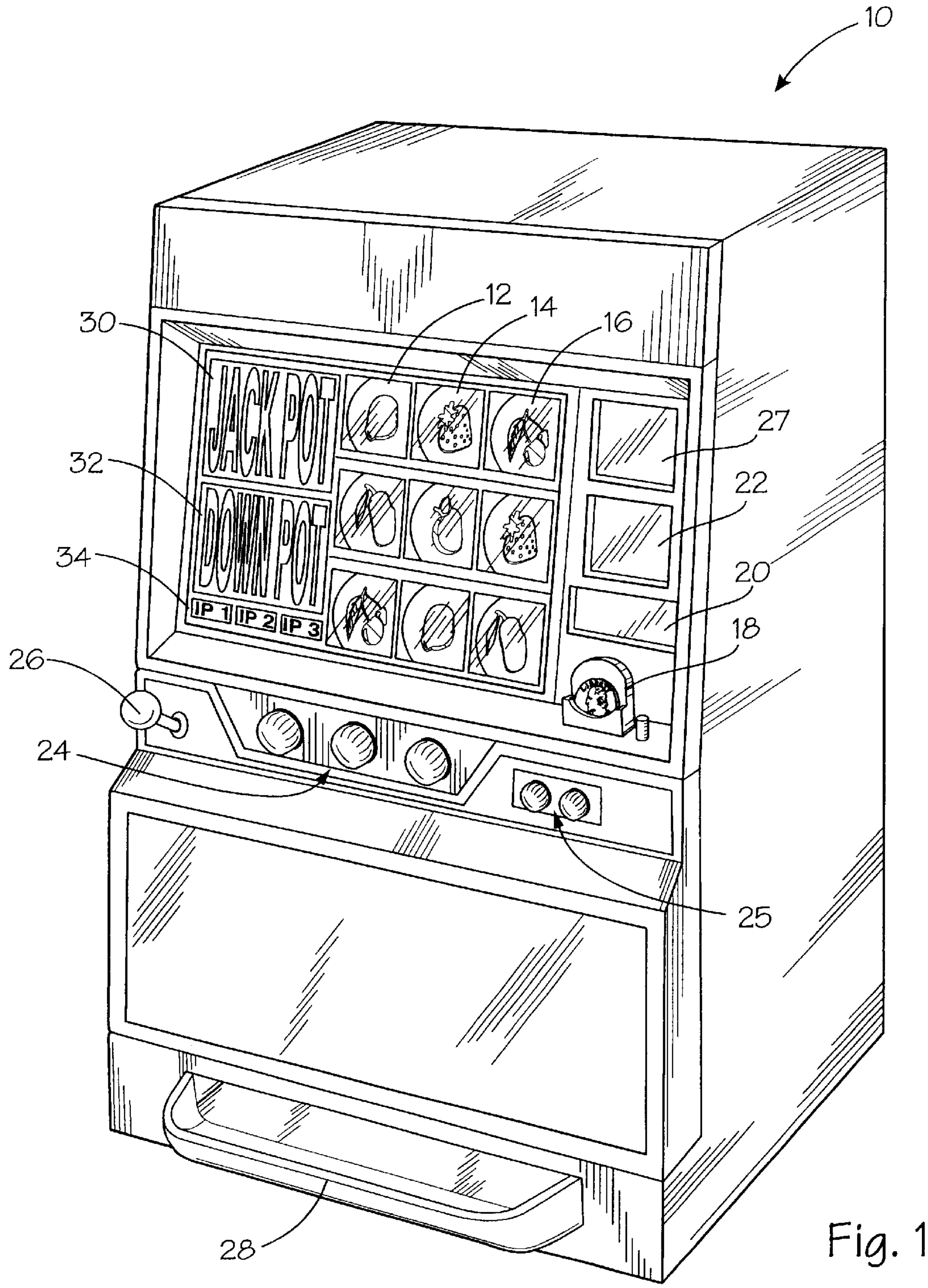
FIG. 1 is a perspective view of a three reel gaming machine in which the present invention has been incorporated.

A typical gaming machine incorporating the present invention is shown in FIG. 1. Gaming machine 10 is of the variety in which the display utilizes three reels 12, 14, and 16 which may be of the mechanical or video variety, both of which are well known in the art. Gaming machine 10 may include any number of the known controls and receptors, such as coin receiving slot 18, bill receptor 20 and magnetic card scanner 22. A plurality of credit, pay, and game selection controls are indicated at 24, 25 and an activation arm is indicated at 26. Everything thus far described is old in the art and of itself constitutes no part of the instant invention.

Activation of the gaming machine begins with the player inserting a coin or coins into slot 18 or when a player places a bill in receptor 20 or when a player passes a magnetic card past scanner 22. Alternatively, if points previously won are credited at 24, they may be returned as desired. When the desired amount has been deposited or recorded, the gaming device is activated by pulling or pushing lever 26, which activitates the processor, shown in FIG. 3 and sets reels 12, 14, and 16 of the display in motion. This process forms no part of the instant invention as it is essentially the normal process of activating all gaming machines and is well known.

Shown alongside reels 12, 14, and 16 is a jackpot 30, a down pot 32, and incentive pots 1, 2, and 3 identified as 34.

The gaming machine is programmed to have a plurality of regular payouts. The payouts are controlled by a pre-selected number of alignments of various symbols on each roll. For example, when three tens align along a selected line there is a payout of a selected amount. This payout may be in the form of a credit indicated on screen 27 or it may be in the form of money received in drawer 28. The player can call in or access the accrued credits in the form of a payout at any time by activating the appropriate control 24.

A plurality of such selected payouts are programmed into the control of the gaming machine. Each payout for each alignment of symbols is different going from a small value to a large value.

An alignment of specific selected symbols constitutes a jackpot win. The payout for the jackpot 30 is larger than any one of the selected payouts and this payout is delivered directly to the player in the form of credits or cash.

An alignment of other specific symbols brings about a win of the down pot 32. The value of the down pot is also greater than any one of the selected payouts and may be less, equal, or greater than that of the jackpot.

When the symbols chosen to dictate a down pot win are aligned across the display, the values of the down pot is distributed into three incentive pots 34 which are individually designated IP1, IP2, and IP3. The incentive pots are each tied to a selected or further chosen one of the selected payment alignment of symbols. Alignment of anyone of these further chosen alignment of symbols brings about a payout equal to the preselected value plus a payout equal to the down pot value delivered to the associated incentive pot.

For example, two cherries aligned may normally constitute a small payout which occurs relatively often. Incentive pot 1 may be tied to two cherries, so that when incentive pot 1 is filled and two cherries appear, the normal two cherry payout along with the value of incentive pot 1 is delivered to the player either in credits or cash.

Incentive pots 2 and 3 are each tied to another of the symbol alignments providing a preselected payout and are accessed to the player in the manner just described.

Figure 2:
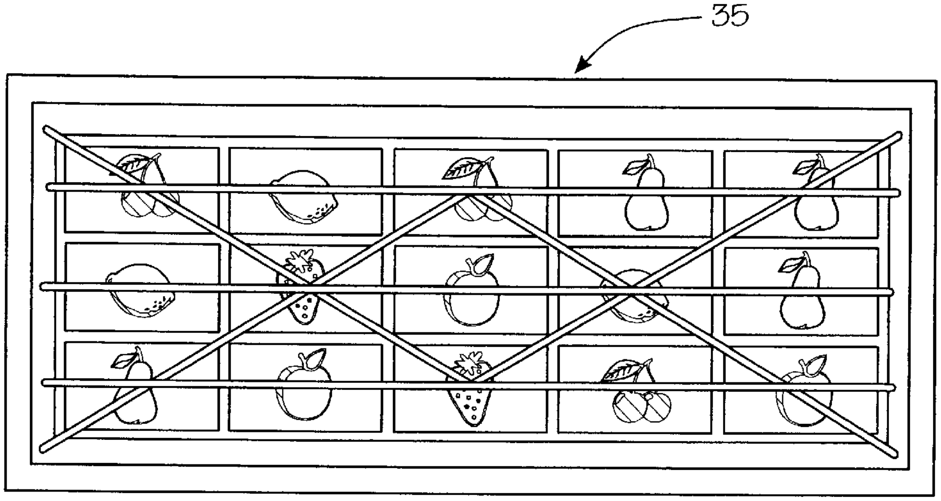
FIG. 2 is an exploded sectional view of a five reel arrangement with which the instant invention may be incorporated; and, FIG. 3 is a block diagram of a machine control.

The gaming machine 10 constitutes one of many known machines which may include a jackpot. The down pot and incentive pot system may be incorporated with this machine to provide the incentive system of the invention. The machine in FIG. 1 is a three reel, or three vertical lines, eight-line payout machine. A machine with five vertical lines with a five-line payout, as indicated at 35 in FIG. 2, may also be utilized with the system of the invention to include jackpot, down pot, and incentive pot arrangement. Further, the invention is not limited from use with any currently known gaming machine.

The jackpot, down pot, and incentive pots may be tied to a plurality of machines so that the player may play more than one machine at a time. Various combinations utilizing a plurality of machines are well known in the art.

Figure 3:
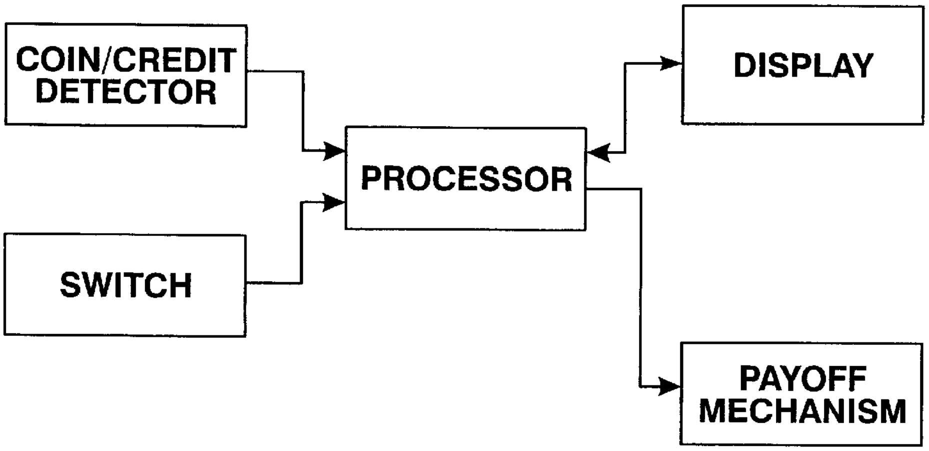

In practice, a control system as shown in FIG. 3 may be provided to operate the machine. In the shown arrangements, coin/credit detector determines the value lines and machines being played, the switch sends a signal to the processor which activates the display which either causes mechanical movement of the reels or electrical simulated movement. An alignment along a selected line of a plurality of lines of symbols indicating a payout causes the payout mechanism to activate. This is a very basic control.

While a preferred embodiment of the invention has been described using specific terms, such description is for illustrative purposes only, and it is to be understood that changes and variations may be made without departing from the spirit or scope of the following claims.

What is claimed is:

1. A gaming machine comprising:

a plurality of reels having a plurality of symbols thereon forming a display of aligned symbols;

a processor for causing said symbols to change positions forming different alignments of said symbols on said display;

an actuator for activating said processor;

a plurality of winning combinations of aligned symbols, said processor being operative to deliver a payout of preselected and different value whenever anyone of said winning combinations of aligned symbols appears on said display;

a first selected group of said symbols, when aligned comprising a jackpot alignment of symbols, said processor being operative to deliver a payout of a value greater than anyone of said preselected values whenever said jackpot alignment of symbols appears on said display;

a second selected group of said symbols, when aligned on said display comprising a down pot alignment of said symbols, said processor being operative to deliver a credit of a value, greater than anyone of said preselected values to a plurality of incentive pots whenever alignment of said down pot alignment of symbols appears on said display;

a selected one of said winning combinations of aligned symbols being associated with each of said incentive pots; and said processor being operative to delivering a payout comprising the value of said selected one of said winning combinations of aligned symbols and the credited value of the associated one of said incentive pots whenever said selected one of said winning combinations of symbols becomes aligned on said display when said associated of said incentive pots is credited with value.

2. The gaming machine of claim 1 wherein said reels are mechanical.

3. The gaming machine of claim 1 wherein said reels are video reels.

4. The gaming machine of claim 1 wherein there are at least three reels.

5. The gaming machine of claim 1 wherein there are at least five reels.

6. The gaming machine of claim 1 wherein said predetermined alignments may appear along up to eight lines.

7. The gaming machine of claim 1 wherein said gaming machine may be interconnected with other gaming machines.

8. The gaming machine of claim 7 wherein said jackpot and said down pot are interconnected with all of said interconnected gaming machines.

9. A method of conducting a game of chance on a gaming machine, said method including:

providing a display having a plurality of reels each with a plurality of symbols;

providing a processor for activating said reels;

actuating said processor causing said symbols to change alignments on said display;

providing that alignment of preselected ones of said symbols on said display constitute winning combinations each of which delivers a regular pay out of a preselected and different value;

providing a jackpot and a down pot each with a payout of a preselected value greater than the preselected value of any one of said regular pay outs;

providing a plurality of incentive pots and causing said incentive pots to receive said down payout;

providing an alignment of a first selected combination of said symbols to constitute a jackpot winning combination and delivering said jackpot payout upon said jackpot combination of symbols being aligned on said display;

providing alignment an of a second selected combination of said symbols to constitute a down pot activating combination and delivering said down pot payout to said plurality of incentive pots upon said down pot combination of symbols being aligned on said display;

providing that each one of said incentive pots be individually activated by the alignment on said display of chosen and different ones of said preselected of said winning combinations of aligned symbols; wherein, when said incentive pots contain the payout value of said down pot, alignment on said display of said chosen ones of said preselected symbols delivers the regular payout value of said activating combination of symbols along with the payout value of the associated of said incentive pots.

10. The method of claim 9 including providing said reels are mechanical.

11. The method of claim 9 including providing said reels are video.

12. The method of claim 9 including providing at least three reels.

13. The method of claim 9 including providing at least five reels.

14. The method of claim 9 including providing that said predetermined alignments may appear along up to eight lines.

15. The method of claim 9 including interconnecting a plurality of gaming machines capable of being simultaneously operated at a single machine.

16. The method of claim 15 including providing a single jackpot and down pot for said plurality of gaming machines.

* * * * *